(12) United States Patent
Healey et al.

(10) Patent No.: US 9,506,769 B2
(45) Date of Patent: Nov. 29, 2016

(54) SYSTEM AND METHOD FOR FAMILIARITY-BASED NAVIGATION

(71) Applicant: Intel Corporation, Santa Clara, CA (US)

(72) Inventors: Jennifer A Healey, San Jose, CA (US); Victoria S Fang, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/319,325

(22) Filed: Jun. 30, 2014

(65) Prior Publication Data

US 2015/0377640 A1 Dec. 31, 2015

(51) Int. Cl.
*G01C 21/34* (2006.01)
*G01C 21/36* (2006.01)

(52) U.S. Cl.
CPC ....... *G01C 21/3484* (2013.01); *G01C 21/3605* (2013.01)

(58) Field of Classification Search
USPC ............... 701/409–411, 42.4, 468, 538, 521, 701/33.4, 533, 400; 707/E17.001
See application file for complete search history.

(56) References Cited

U.S. PATENT DOCUMENTS

| | | | | |
|---|---|---|---|---|
| 5,557,524 A | * | 9/1996 | Maki | 701/32.4 |
| 7,672,764 B2 | * | 3/2010 | Yoshioka et al. | 701/32.3 |
| 8,738,285 B2 | * | 5/2014 | Scofield et al. | 701/410 |
| 8,862,385 B2 | * | 10/2014 | Byrne et al. | 701/411 |
| 2008/0177994 A1 | * | 7/2008 | Mayer | G06F 9/4418 713/2 |
| 2008/0319645 A1 | * | 12/2008 | Kumagai | G01C 21/3461 701/533 |
| 2009/0240517 A1 | * | 9/2009 | Pelter | G06Q 50/14 705/306 |
| 2010/0217525 A1 | * | 8/2010 | King | G06Q 30/02 701/300 |
| 2011/0307280 A1 | * | 12/2011 | Mandelbaum | G06Q 10/025 705/6 |
| 2014/0019176 A1 | * | 1/2014 | Mandelbaum | G06Q 10/025 705/6 |

(Continued)

FOREIGN PATENT DOCUMENTS

JP 2007-164502 * 6/2007 ......... G01C 21/3461

OTHER PUBLICATIONS

Walking support system with robust image matching for users with visual impairment; Yamamoto, K. ; Suganuma, K. ; Sugimori, D. ; Murotani, M. ; Iwamoto, T. ; Matsumoto, M.; Systems, Man, and Cybernetics (SMC), 2011 IEEE International Conference on DOI: 10.1109/ICSMC.2011.6083821; Publication Year: 2011 , pp. 1100-1105.*

(Continued)

*Primary Examiner* — Cuong H Nguyen
(74) *Attorney, Agent, or Firm* — Garrett IP, LLC

(57) ABSTRACT

Methods and systems to provide navigational assistance to a traveler. Given a start point and a destination, one or more routes may be generated using routes, or segments thereof, that are familiar to the traveler. This provides a route from the start point to the destination where at least some of the route is familiar to the traveler. Such a route may then be provided to the traveler. A description of the route may be provided in the form of a map and/or verbal or written directions. In alternative embodiments, landmarks may be incorporated into the route description as a way of assisting the traveler. In embodiments, difficult driving maneuvers may be highlighted in the description of the route. The description may point out that a given difficult maneuver is similar to a maneuver that the traveler has previously encountered, and remind the traveler of the location where this maneuver was previously seen.

24 Claims, 10 Drawing Sheets

(56) References Cited

U.S. PATENT DOCUMENTS

2014/0100780 A1* 4/2014 Caine et al. .................. 701/533
2014/0156188 A1* 6/2014 Hart et al. .................... 701/538
2014/0156189 A1* 6/2014 Hart et al. .................... 701/538

OTHER PUBLICATIONS

Routing Service Quality—Local Driver Behavior Versus Routing Services; Ceikute, V. ; Jensen, C.S.; Mobile Data Management (MDM), 2013 IEEE 14th International Conference on; vol. 1; DOI: 10.1109/MDM.2013.20; Publication Year: 2013 , pp. 97-106.*
K.-P. Chang, L.-Y. Wei, M.-Y. Yeh, and W.-C. Peng. Discovering personalized routes from trajectories. In LBSN, pp. 33-40, 2011.*
M. Vlachos, D. Gunopoulos, and G. Kollios. Discovering similar; multidimensional trajectories. In ICDE, pp. 673-685, 2002.*
Z. Chen, H. T. Shen, and X. Zhou. Discovering popular routes from trajectories. In ICDE, pp. 900-911, 2011.*
Y. Zheng, L. Zhang, X. Xie, and W.-Y. Ma. Mining interesting locations; and travel sequences from GPS trajectories. In WWW, pp. 791-800, 2009.*
"Back-Seat Driver": Spatial Sound for Vehicular Way-Finding and Situation Awareness; Cohen, Michael ; Fernando, O.N.N. ; Nagai, T. ; Shimizu, K.; Frontier of Computer Science and Technology, 2006. FCST '06. Japan-China Joint Workshop on DOI: 10.1109/FCST.2006.1; Publication Year: 2006 , pp. 109-115.*

* cited by examiner

SYSTEM AND METHOD FOR FAMILIARITY-BASED NAVIGATION

TECHNICAL FIELD

Embodiments described herein relate to automated navigation assistance.

BACKGROUND

Navigation technology has been generally available to consumers for several years. Global Positioning System (GPS) devices are commonly built into automobiles, and are readily available as portable devices. Maps and navigational applications are available on personal computing devices, such as tablet computers and smartphones. As a result, a traveler may now find his current location when in a vehicle or when walking, and can navigate using this technology. The traveler is presented with electronic maps, and can receive point-to-point directions upon request.

Nonetheless, some issues may remain for the traveler, even if he or she is given a route using the above technology. Not everyone is good at reading maps, for example. Moreover, a lack of familiarity with a route can be a problem, especially from an experiential or emotional standpoint. The traveler may have no experience with the route; he or she may see no familiar landmarks and, despite the availability of a map, a traveler may become disoriented, otherwise confused, or overcome with feelings of anxiety or uncertainty.

In addition, the traveler, even when given automated directions, may have to undertake difficult or unusual driving maneuvers with which he has minimal experience. Examples of these may include traffic circles, u-turns, or left-hand exits from an interstate highway. In another example, exit ramps are often close together and represented as stacked on top of other roads on a conventional two-dimensional map. Here the driver has to execute a difficult maneuver that is visually unclear on a map and difficult to explain in generic terms via voice. Moreover, maneuvers like this must be completed quickly. Therefore, even when given a particular route to follow, a traveler may still have difficulty getting to his desired destination.

BRIEF DESCRIPTION OF THE DRAWINGS/FIGURES

Figure 1:
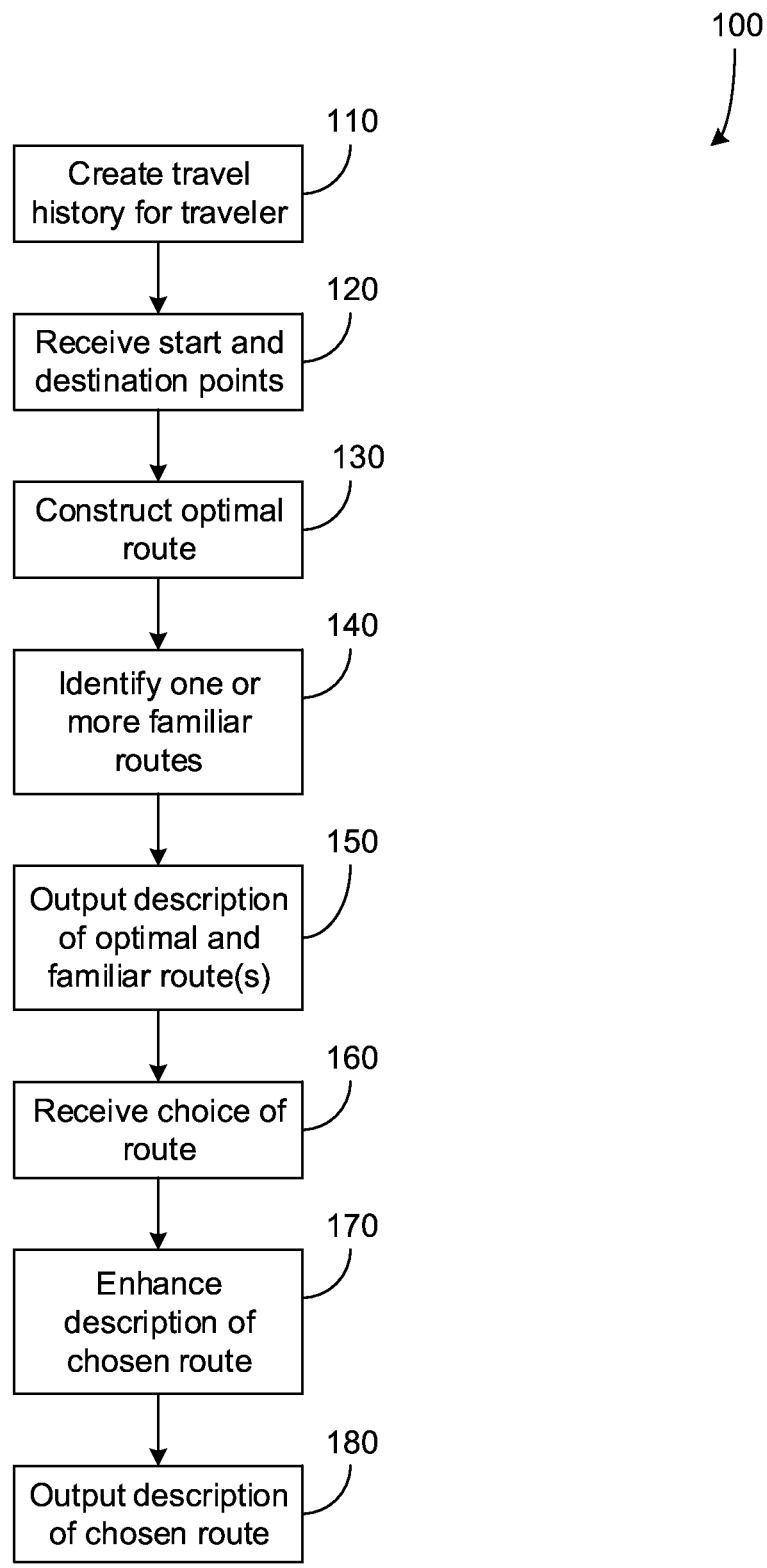
FIG. 1 illustrates processing of the system described herein, according to an embodiment.

In the drawings, the leftmost digit(s) of a reference number identifies the drawing in which the reference number first appears.

DETAILED DESCRIPTION

An embodiment is now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

Disclosed herein are methods and systems to provide navigational assistance to a traveler. Given a start point and a destination, one or more familiar routes may be identified, where these routes include previously traveled routes, or segments thereof, that are familiar to the traveler. The identified route(s) go from the start point to the destination such that at least some of the route is familiar to the traveler. A description of the route(s) may be provided in the form of a map and/or audio or text directions. In alternative embodiments, landmarks may be incorporated into the route description as a way of assisting the traveler. In embodiments, difficult driving maneuvers may be highlighted in the description of the route. The description may point out that a given difficult maneuver is similar to a maneuver that the traveler has previously encountered, and may remind the traveler of the location where this maneuver was previously seen.

Processing of the system described herein is illustrated in process 100 of FIG. 1, according to an embodiment. At 110, a travel history may be created for the traveler. This history may include specific routes he has taken, and how often he has taken them. This history may also include difficult driving maneuvers that he has encountered, and where they were encountered. Construction of such a travel history will be described in greater detail below.

At 120, a request for directions may be received. This request may include definitions for start and destination points. This input may be received through a keyboard, a touchscreen, a pointing device such as a mouse, a microphone supported by voice recognition technology, for example, or any combination thereof. At 130, an optimal route may be constructed in an embodiment, using a map from a map database and using techniques in optimal graph traversal, as is known by persons of ordinary skill in the art. The optimal route may represent the fastest route, for example, and/or the shortest route. This optimal route may later be provided to the traveler in addition to one or more familiar routes, the creation of which will be described in greater detail below. By providing an optimal route along with one or more familiar routes, the traveler may have a choice as to whether to take a familiar route, or the shortest route in this embodiment.

At 140, one or more familiar routes may be identified. As will be discussed below, these routes may be constructed using a map and information from the travel history regarding routes that the traveler has previously taken.

At 150, descriptions of the optimal route and the familiar route(s) may be output. The form of this representation may differ in various embodiments. An electronically displayed or printed map may be presented to the traveler, for example. Alternatively or in addition, the descriptions of the routes may be output to an electronic storage medium. At 160, a choice may be received from the traveler regarding which route is preferred. This input may be received through a keyboard, a touchscreen, and/or a pointing device such as a mouse, for example.

At 170, the chosen route may be enhanced. This may include the addition of visible reference points or landmarks along the route that would help the traveler navigate. A given turn may be located at a church, firehouse, or well-known statue for example. By adding such information to the route description, the traveler can be on the lookout for such reference points and may be guided by them.

Enhancement may also take the form of identifying difficult traffic maneuvers in the chosen route. In an embodiment, a list of such maneuvers may be constructed, and may include such maneuvers as a left-hand exit from a major highway, a left-hand entrance to such a highway, a traffic circle, and/or a u-turn, for example. If any maneuver from this list occurs in the chosen route, the travel history may be searched to determine if the traveler has encountered the maneuver before and, if so, where. If such a maneuver was previously seen by the traveler, and such a maneuver occurs on his chosen route, then he may be given advance warning of the maneuver beforehand or while en route, and told that it is similar to a maneuver previously encountered at the location identified in the travel history.

At 180, a description of the chosen route may be output for the traveler. In various embodiments, this may take the form of an electronic or printed map, and/or text or audio instructions.

As would be understood by a person of ordinary skill in the art, an alternative sequence of the processes of FIG. 1 may be implemented in an alternative embodiment. For example, in an alternative embodiment, the optimal route may be constructed after identification of familiar routes. In an alternative embodiment, the optimal route and the identified familiar routes may all be enhanced prior to the choice of 160.

Moreover, the processing of FIG. 1 may take place in a single user device, such as a smart phone, GPS unit, laptop, or desktop computer, for example; alternatively, some of these processes may be performed remotely. The travel history may be created and/or maintained remotely, for example. The construction of an optimal route, the identification of one or more familiar routes, and/or the enhancement of a route may also be performed remotely in various embodiments.

Figure 2:
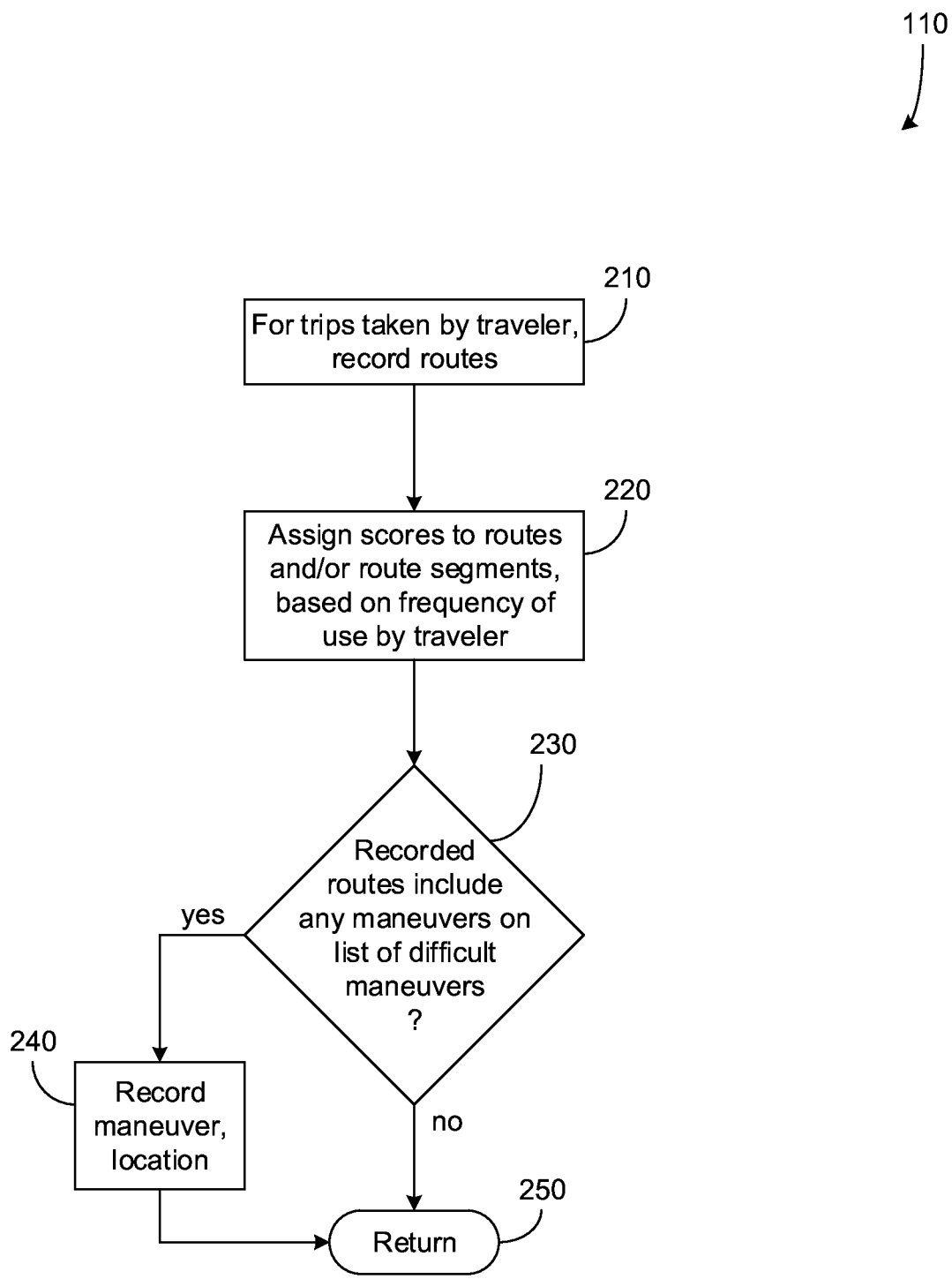
FIG. 2 is a flow chart illustrating the creation of a travel history, according to an embodiment.

The construction of a travel history (110 of FIG. 1) is illustrated in FIG. 2 according to an embodiment. At 210, routes taken by the traveler may be recorded. This may be accomplished by recording the tracking data that is typically obtained and output by navigational devices such as GPS devices and appropriately programmed smartphones, for example. Such devices routinely track a user's location while traveling; in an embodiment, a traveler's route may be recorded by saving a sequence of such locations. In an embodiment, the recording of such routes may take place over a fixed time interval, such as the preceding month or year, for example.

At 220, scores may be assigned to the routes recorded, where the scores represent the frequency of travel. In an embodiment, scores may be assigned to segments of such routes. A route from point A to point B will generally be different from a route from point C to point D. Both trips, however, may use the same stretch of a given highway, for example. This stretch of highway may therefore be more frequently traveled (and may therefore be given a higher score), than other segments of either trip. In an embodiment, scores may be updated as the traveler repeats trips and/or takes new or additional trips.

At 230, a determination may be made as to whether any of the recorded routes include a difficult driving maneuver. As discussed above, a list may be maintained for maneuvers considered difficult. The routes recorded for the travel history may be scanned to determine if any of the listed maneuvers occur. If so, then at 240, any such maneuvers in the recorded routes may themselves be noted, along with their locations. If not, at 250, the process may return to process 100.

Figure 3:
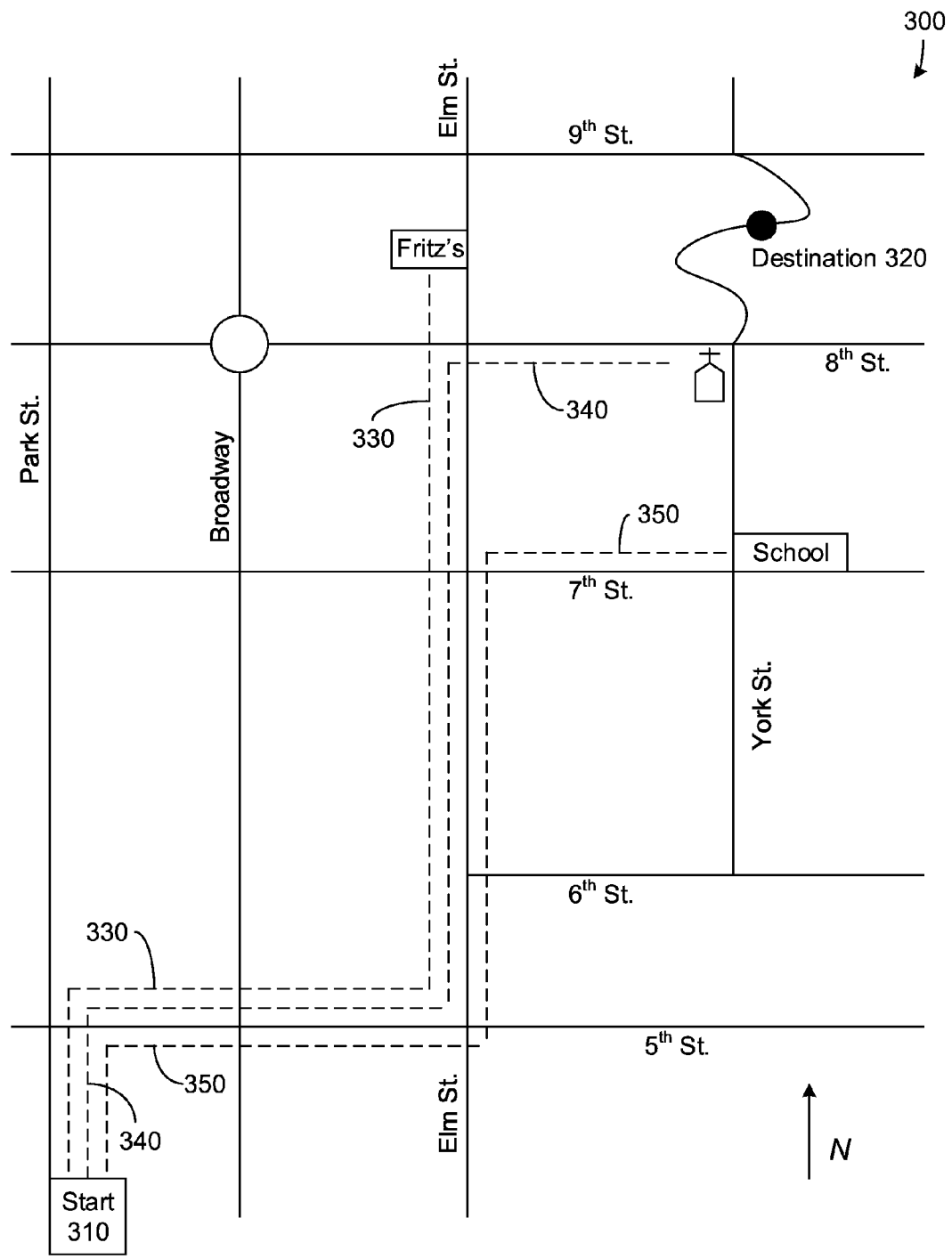
FIG. 3 is a map showing a traveler's previously traveled routes as recorded in a travel history, according to an embodiment.

FIG. 3 illustrates an example 300 of a traveler's routes that may be recorded in a travel history. Here, the traveler may have a start point 310, such as the traveler's home.

Three routes are shown. Route 330 begins at start point 310, heads north on Park St. to $5^{th}$ St., then east on $5^{th}$ St. to Elm St., then north to Fritz's Tavern. The traveler goes to Fritz's every Friday for happy hour, then goes home again, so that in the course of a month he travels route 330 eight times.

Route 340 begins by heading north on Park St. to $5^{th}$ St, then east on $5^{th}$ St. to Elm St. This route then turns north on Elm St. to $8^{th}$ St. Route 340 then turns east on $8^{th}$ St. and ends at the church at the corner of $8^{th}$ St. and York St. The traveler takes route 340 to church and back, but does so only once a month on average, when feeling guilty. In a month's time, the traveler only makes this round trip once, therefore traveling route 340 twice.

Route 350 begins at start point 310, heads north on Park St. to 5th St., then east on 5th St. to Elm St., then north on Elm to $7^{th}$ St. Here, the route heads east one block to the school at the corner of York and $7^{th}$ Streets. In the example of FIG. 3, if the traveler takes his child to school and back every week day, he travels route 350 ten times a week, and 40 times in the course of a month.

The traveler uses different segments of these routes with different frequencies:

The route segment from start point 310, north on Park St. to 5th St., then east on 5th St. to Elm St., then north on Elm to 7th St., is taken 50 times a month (40 times a month when going to school and back, twice a month when going to church and back, and eight times a month when going to Fritz's Tavern and back).

The segment of route 350 from the corner of Elm and $7^{th}$ Streets to the school is traveled 40 times a month.

The segment from the corner of Elm and 7th Streets to the corner of Elm and $8^{th}$ Streets is taken ten times a month (twice a month when going to church and back, and eight times a month when going to Fritz's Tavern and back).

The segment from the corner of Elm and $8^{th}$ Streets to the church is taken two times each month.

The segment from the corner of Elm and $8^{th}$ Streets to Fritz's is taken twice weekly, or eight times a month.

Consequently, each of these segments may be given a different score, based on the frequency of travel. In an embodiment, the score for a given segment may correlate to and be a function of the frequency of travel as seen in the travel history, so that a more frequently used route segment is given a higher score.

Figure 4:
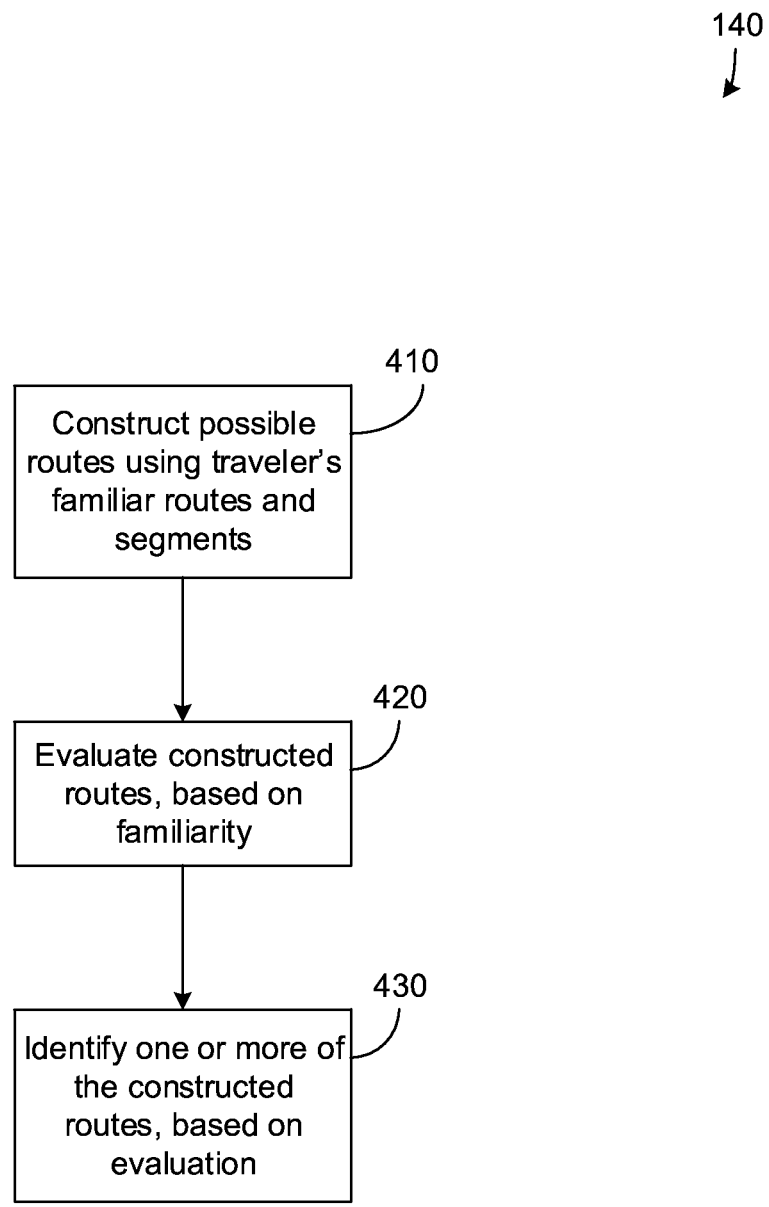
FIG. 4 is a flow chart illustrating the identification of one or more familiar routes, according to an embodiment.

The identification of familiar routes (140 of FIG. 1) is illustrated in FIG. 4, according to an embodiment. At 410, possible routes are constructed from the start point to the destination, where these routes are constructed to incorporate familiar routes and/or familiar route segments as identified in the travel history.

From a topological perspective, this may potentially generate a large number of routes. In an embodiment, there may be a need to constrain the results of the construction process. Therefore, at 420, an evaluation process may take place. The evaluation process of 420 may include, for example, deriving a familiarity metric for each constructed route to measure the overall level of familiarity for each constructed route. One possible familiarity metric may be a weighted sum of the familiarity scores for the segments in the constructed route, where greater weight is given to longer segments. Other functions may be used in place of or in addition to the weighted sum, as would be understood by a person of ordinary skill in the art.

The evaluation may also include another metric that measures the degree of convenience or inconvenience, relative to the optimal route generated at 130 of FIG. 1. If a constructed route has an expected travel time or overall distance that is close to that of an optimal route, then the convenience metric may be higher. Conversely, if a constructed route has a longer travel time or distance relative to the optimal route, then the convenience metric may be lower. In an embodiment, the evaluation of 420 may consider one or both of the familiarity and convenience metrics. At 430, one or more of the constructed routes may be selected, based on this evaluation.

Figure 5:
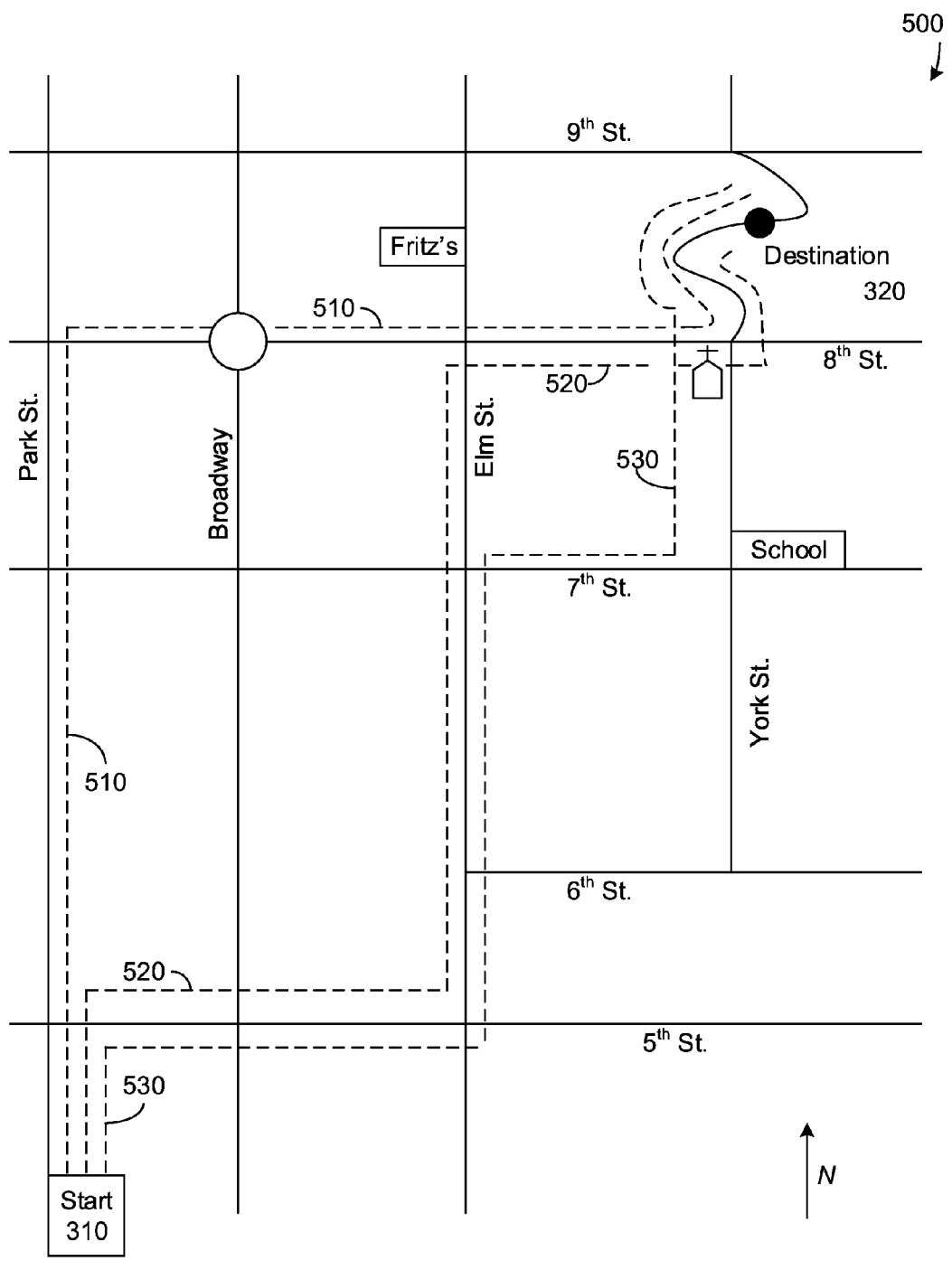
FIG. 5 is a map showing constructed familiar routes, according to an embodiment.

FIG. 5 illustrates an example 500 of three constructed familiar routes, continuing the example of FIG. 3. Each of routes 510, 520, and 530 proceeds from start point 310 to destination 320 using segments of routes 330, 340, and 350 that are familiar to the traveler. Some or all of constructed routes 510, 520, and 530 are familiar at least in part. In an embodiment, the evaluation of these constructed routes may lead to the selection of route 530 at 430 of FIG. 4. In an embodiment, a description of route 530 would be presented to the traveler along with an optimal route. In an alternative, descriptions of either or both of routes 510 and 520 may be presented to the traveler as well.

Figure 6:
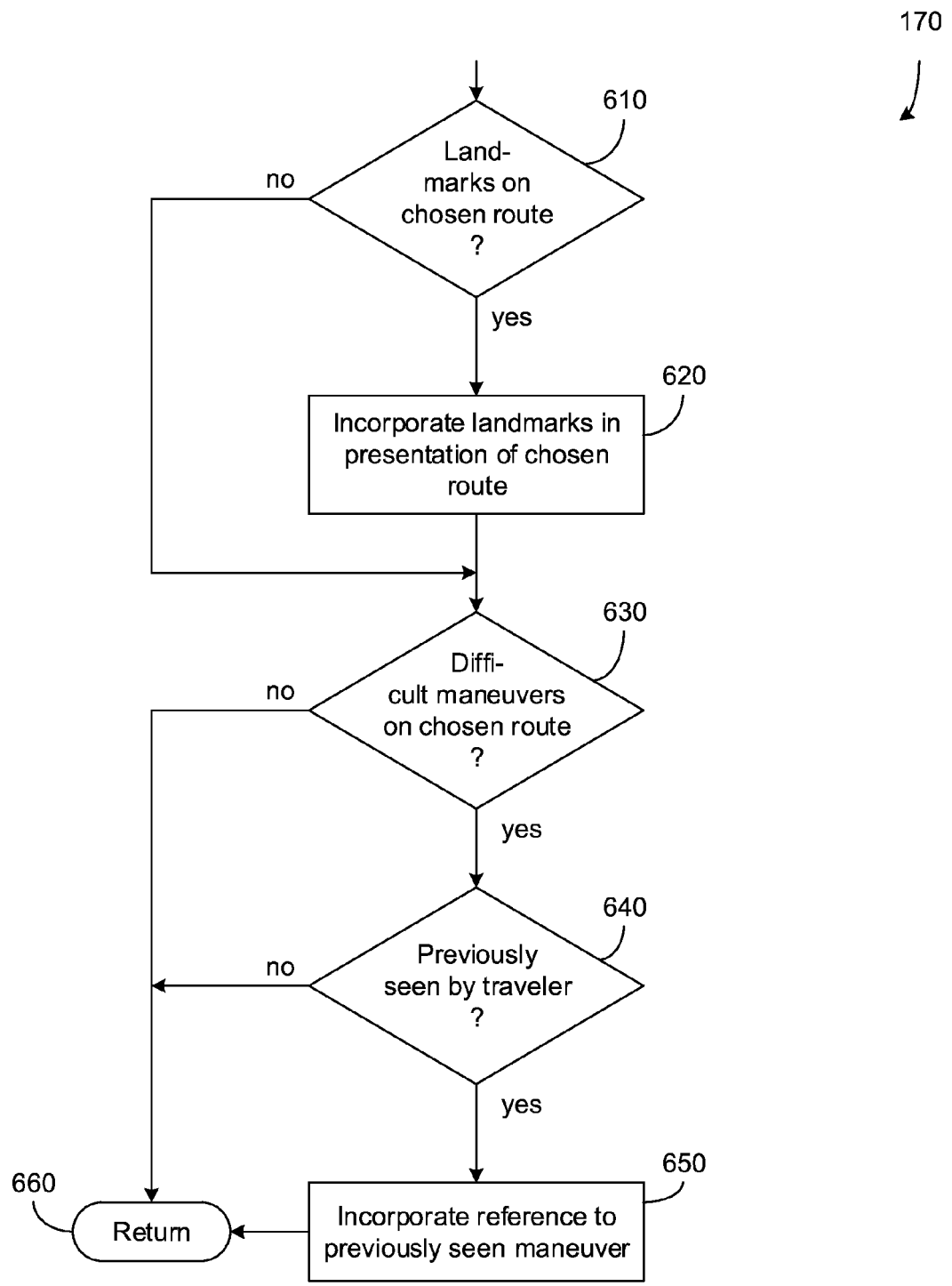
FIG. 6 is a flow chart illustrating enhancement of a route description, according to an embodiment.

The enhancement of a chosen route (170 of FIG. 1) may include the processing illustrated in FIG. 6 in an embodiment. At 610, a determination may be made as to whether landmarks exist on a chosen route. As discussed above, the route chosen by the traveler may be a familiar route, or may be an optimal route. In either event, publicly available information may be used to determine if there are landmarks on the chosen route. Public information sources may include business and community directories, online maps, satellite imagery, and/or street-level imagery. Examples of landmarks may include well known and easily visible businesses such as fast food restaurants, gas stations, or shopping centers, and other visible public facilities such as parks, schools, and churches. These landmarks may be customized to the driver. For example, if it is known from the travel history or other information that a traveler frequents a particular fast food chain, a search may be done on that name and such restaurants may be preferentially used as landmarks if located along the route. Signage may also be used as landmarks. If any such landmarks are found to be on the chosen route at 610, then references to the landmark(s) may be incorporated in the description of the route presented to the traveler at 620. They may, for example, take the form of labeled icons on a printed or electronic map, or may be identified as reference points on a list of directions.

At 630 it may be determined whether the chosen route includes any maneuvers that occur on a predetermined list of difficult maneuvers. Such maneuvers may include traffic circles, left-hand merges, left-hand exits, and u-turns, for example and without limitation. Other examples might include highway exits with three rather than the normal two exit options, rotaries with five or six options, intersections with highly acute angles or with multiple options than what could otherwise be described as "right" or "left." In an embodiment, such maneuvers may be identified in a chosen route by automated pattern matching algorithms known to persons of ordinary skill in the art. Such patterns could be evaluated by an algorithm that is able to classify intersection types, for example, and then find the closest match within the known database of familiar intersections that the traveler has traversed.

For any such maneuver detected in the chosen route, at 640 a determination may be made as to whether the maneuver has been encountered before by the traveler, as revealed in his travel history. If so, then at 650 this maneuver may be referenced in the description of the chosen route presented to the traveler. This reference may appear as a highlighted portion of the route, and/or mentioned explicitly in a list of directions. At 660, the process may return to process 100.

The reference may also identify where the traveler has encountered the maneuver before. Such location information may be read from the travel history. In some situations it may be helpful to have the current situation compared to a similar situation that is well known to the traveler, for example: "Exit at 36 then wait for the third right exit like the Oregon Expressway exit off 101" instead of "Exit at 36 then keep left and bear right in 800 feet." Because distance numbers are less intuitively meaningful to people, comparative directions offer a better method for people to understand what they need to do to get to their destination.

Figure 7:
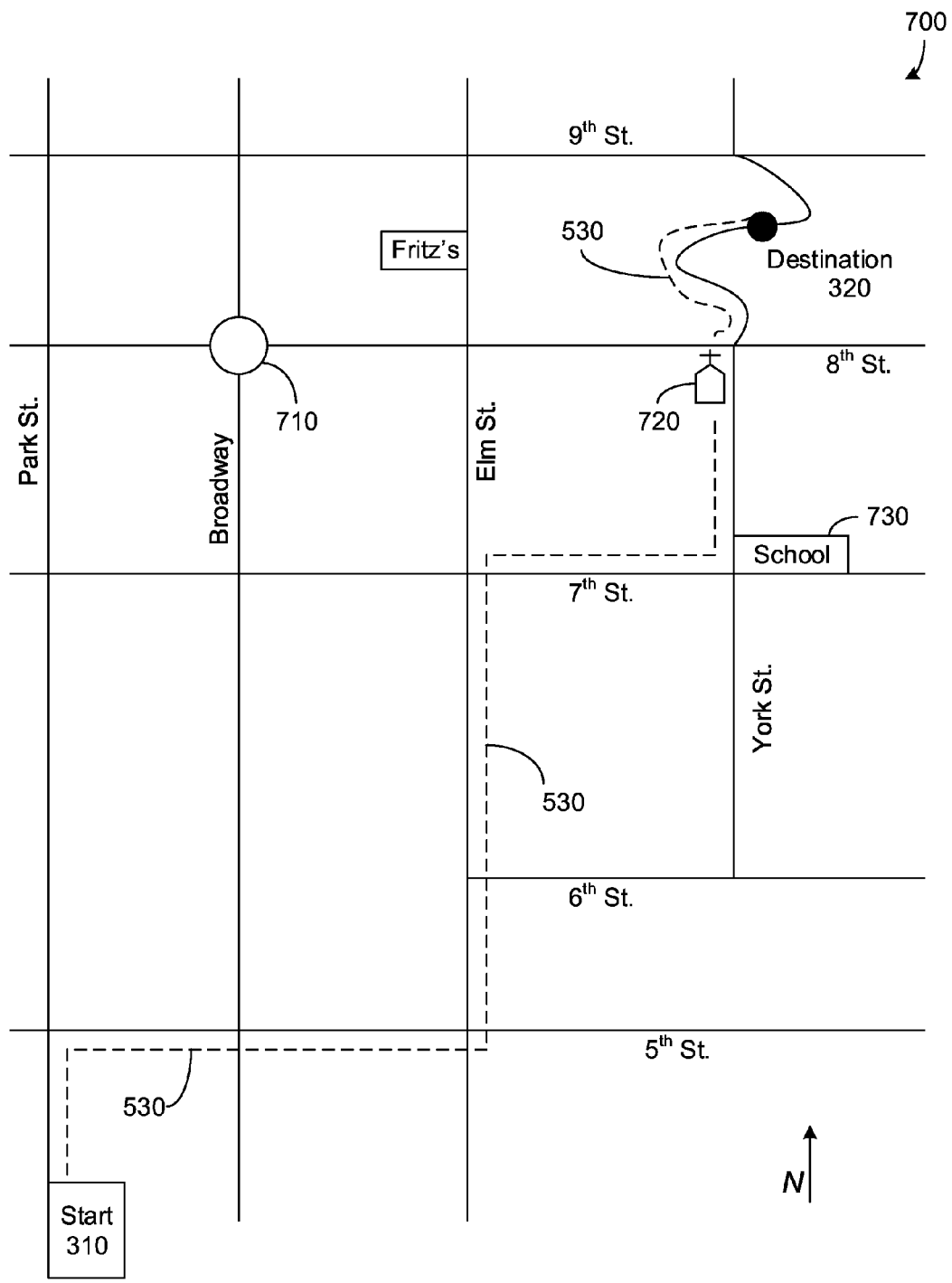
FIG. 7 is a map showing a constructed familiar route chosen by the traveler, according to an embodiment.

A chosen route 530 is illustrated in example 700 of FIG. 7, according to an embodiment. The route leaves the start point 310 and heads north along Park St. to $5^{th}$ St. There, the route turns right and proceeds east to Elm St. At the corner of $5^{th}$ and Elm, the route turns north along Elm St. to $7^{th}$ St. At $7^{th}$ St., the route turns east to York St. Here, at school 730, the route goes north along York St., past church 720 at the corner of Elm and 8th Streets to destination 320. This route may be presented to the traveler as a printed or displayed map, and may include written or spoken directions. Landmarks may have been identified along the route, such as school 730 and church 720. These may be highlighted and/or labeled on the map, and mentioned in written or spoken directions.

The route 530 may represent a familiar route, one of the constructed routes shown in FIG. 5. It incorporates segments that have been frequently traversed by the traveler. These include the segment from start point 310 to the corner of $7^{th}$ and Elm Streets, seen every time the traveler took his child to and from the school or went to Fritz's tavern. In addition, route 530 includes the segment from $7^{th}$ and Elm Streets to the corner of $7^{th}$ and York Streets, seen by the traveler every time he took his child to and from the school 730.

Figure 8:
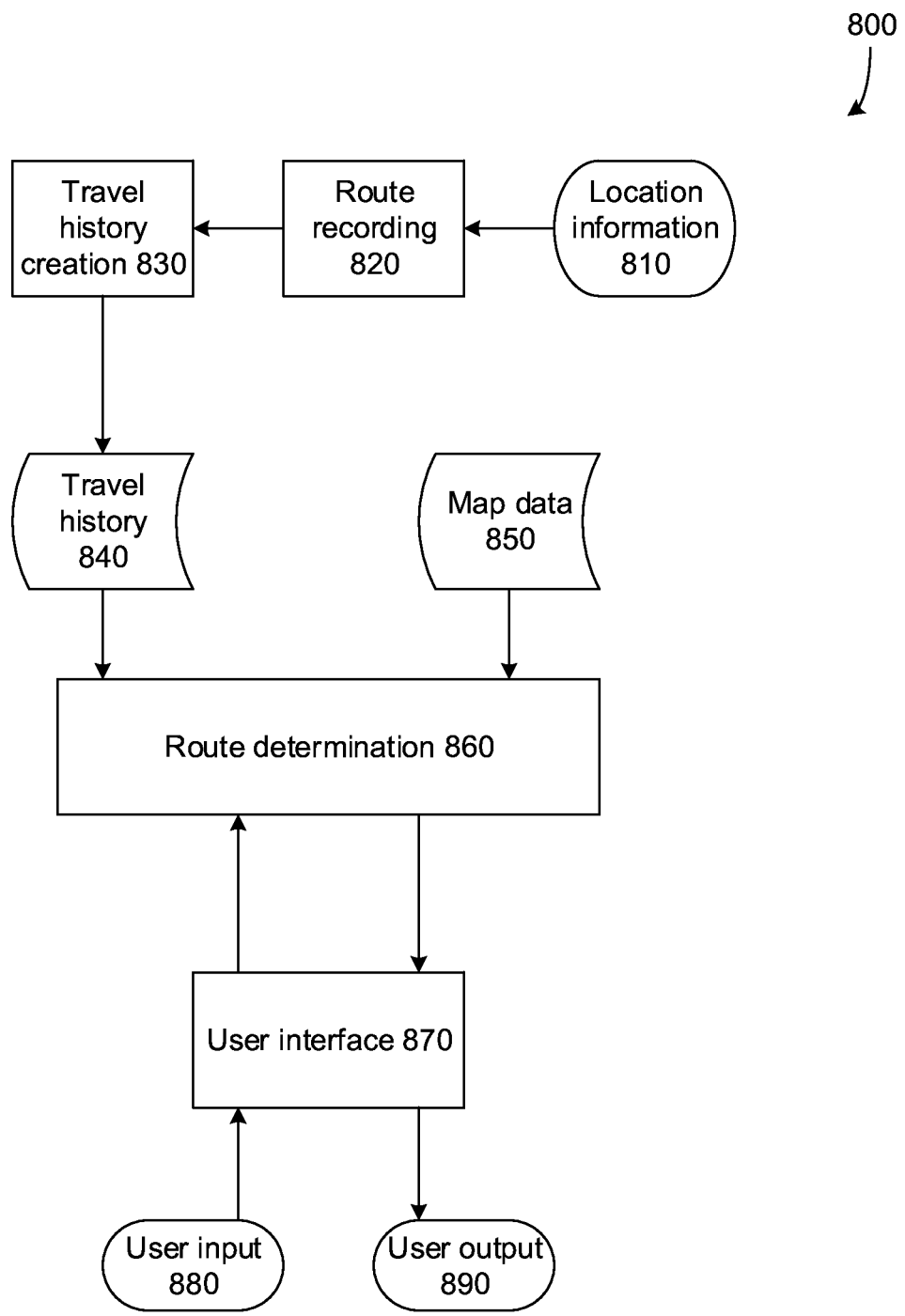
FIG. 8 is a block diagram showing processing modules that implement an embodiment of the system described herein.

A system 800 for implementing the processing described herein is illustrated in FIG. 8, according to an embodiment. A traveler's sequential locations during past trips are represented as location information 810. This information may be used by a route recording module 820 to record routes previously taken by the traveler. The recorded routes may be used by a travel history creation module 830 to create a travel history 840 for the traveler. In an embodiment, the travel history creation module 830 may also identify difficult maneuvers undertaken by the traveler, and the locations at which they were encountered, as observed in the recorded routes output by route recording module 820. The identities and locations of any such difficult maneuvers may then become part of the travel history 840 generated by the travel history creation module 830.

The travel history 840, along with map data 850, may then be used by a route determination module 860 to construct routes for the traveler, given start and destination points. Map data 850 may be a publicly available database of maps indicating streets, highways, and landmarks, for example. Start and destination points may be provided by the traveler as part of user input 880. These points may be entered through a user interface 870 and supplied to the route determination module 860. The user interface 870 may include a keyboard and display, a mouse, stylus, or other pointing device, a touch screen, a microphone, a speaker, or other I/O devices known to persons of ordinary skill in the art, and may also include software to facilitate the operation of such devices.

Route determination module 860 may then construct one or more routes for the traveler. These generated routes may include one or more routes from the start point to the destination point, where these routes are constructed using routes (or segments thereof) that the traveler has encountered previously and that therefore occur in his travel history 840. Such constructed routes are therefore somewhat familiar to the traveler. As described above, these constructed routes may be evaluated, and only those with relatively high familiarity to the traveler may be selected for output. Route determination module 860 may also construct an optimal route, independent of the travel history 840. This may represent the shortest or fastest route between the start and destination points, for example.

Descriptions of certain constructed familiar route(s) and of the optimal route may then be provided via the user interface 870 to the traveler. These descriptions are shown as user output 890. A description of a route may take the form of a displayed or printed map, textual directions, and/or audio directions, or a data structure (e.g., a file) representing the same.

Figure 9:
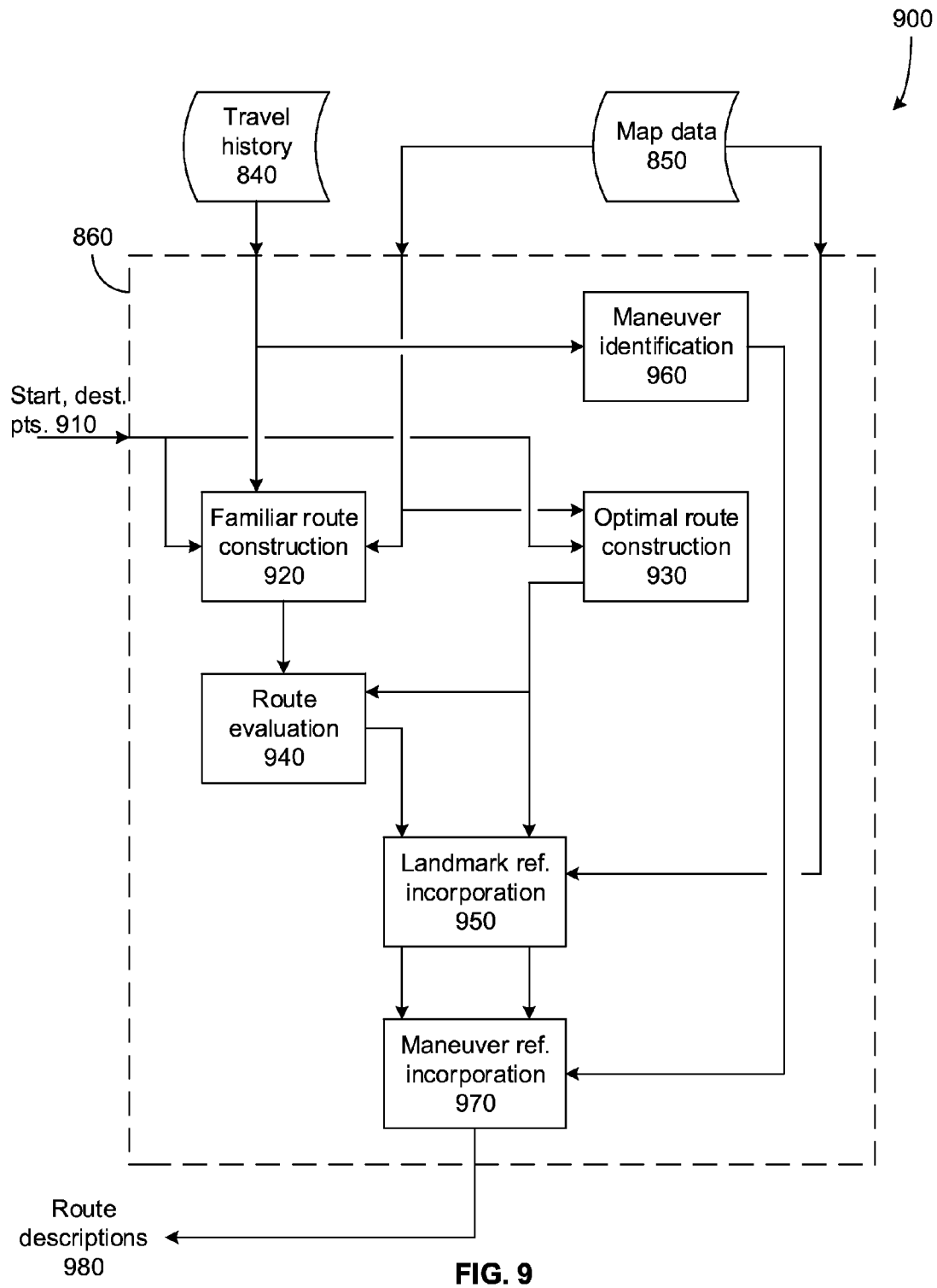
FIG. 9 is a block diagram showing processing modules that implement a route determination module, according to an embodiment.

The route determination module 860 is illustrated in greater detail in diagram 900 of FIG. 9, according to an embodiment. The travel history 840 may be input to the route determination module 860 and received at a familiar route construction module 920. Here, one or more routes may be constructed based on start and destination points 910 (part of user input 880) using routes or segments thereof found in the travel history 840, and using map data 850. The start and destination points 910 may also be provided to an optimal route construction module 930, along with map data 850. This enables the construction of an optimal route, e.g., a fastest and/or shortest route between the start and destination points.

The familiar route construction module 920 may construct one or more familiar routes, which may be provided to a route evaluation module 940. Here, the constructed familiar routes may be evaluated to determine the most familiar route(s). As noted above, in an embodiment this may comprise applying a scoring operation to the constructed familiar routes to evaluate the constructed familiar routes and allow determination of the most familiar one(s). In an embodiment, the optimal route generated by optimal route construction module 930 may also be provided to route evaluation module 940. This would allow a comparison of constructed familiar routes to the optimal route, in order to evaluate the convenience of each constructed familiar route relative to the optimal route. Constructed familiar routes that are significantly longer and/or more time-consuming than the optimal route may be discarded. In an embodiment, a constructed familiar route that is a longer route than the optimal route (either with respect to distance or time) by a predetermined margin may be discarded.

The descriptions of the remaining constructed familiar route(s) output by the route evaluation module 940 may be input to a landmark reference incorporation module 950. This allows for the incorporation of landmark references in the descriptions of these constructed familiar route(s). In an embodiment, the landmarks and their locations may be read from the map data 850. A description of the optimal route generated by optimal route construction module 930 may also be input to the landmark reference incorporation module 950 for the same purpose.

The route descriptions output by the landmark reference incorporation module 950 may then be input to a maneuver reference incorporation module 970, where difficult maneuvers may be referenced in the route descriptions. This may comprise annotation of the route descriptions with identifications of difficult maneuvers that have been previously encountered by the traveler. Such maneuvers may be identified by a maneuver identification module 960 based on the travel history 840. As noted above, difficult maneuvers may be defined as maneuvers similar to those on a predetermined list; such maneuvers may be identified in the route descriptions and in travel history through pattern matching algorithms known to persons of ordinary skill in the art. The completed route descriptions 980 may then be output.

Some or all of the components of route determination module 860 may be incorporated in a computing device of the traveler. Such a device may be a GPS unit, a smartphone, a wearable computer, a tablet computer, or a laptop or desktop computer. Alternatively, some of the components in route determination module 860 may be implemented externally to the traveler's device, e.g., in one or more servers in communication with the traveler's device.

In alternative embodiments, the various modules and processes shown in FIGS. 8 and 9 may be implemented in a different order than what is described here. Moreover, the functionality of the modules shown may be combined into alternative arrangements of modules in other embodiments, as would be understood by persons of ordinary skill in the art.

According to various embodiments, the modules illustrated in FIGS. 8 and 9 may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate arrays (FPGA), logic gates, registers, semiconductor devices, chips, microchips, chip sets, modules composed of such elements, and so forth.

Examples of software may include software components, computer programs, application programs, system programs, machine programs, operating system software, middleware, firmware, software modules, routines, subroutines, functions, methods, procedures, software interfaces, application program interfaces (API), instruction sets, computing code, code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The terms software and firmware, as used herein, may refer to a computer program product including a computer readable medium having computer program logic stored therein to cause a computer system to perform one or more features and/or combinations of features disclosed herein. This computer program logic may represent control logic to direct the processing of the computer. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, random access memory (RAM), read-only memory (ROM), or other data storage device or tangible medium.

Figure 10:
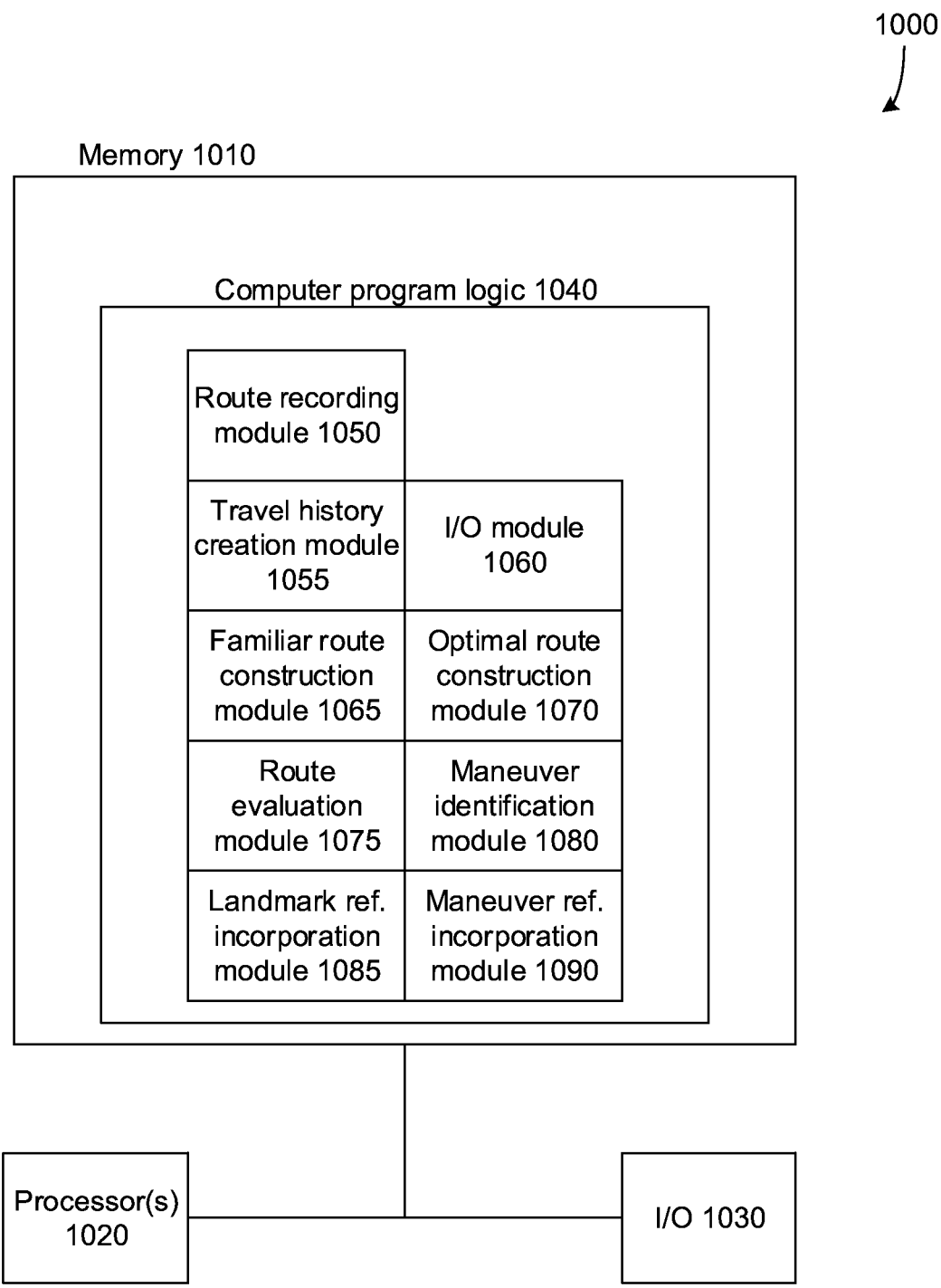
FIG. 10 is a block diagram showing processing modules that in a software or firmware embodiment of the system described herein.

A computing system that executes such software/firmware is shown in FIG. 10, according to an embodiment. The illustrated system 1000 may represent a processor unit and may include one or more processor(s) 1020 and may further include a body of memory 1010. Processor(s) 1020 may include one or more central processing unit cores and/or a graphics processing unit having one or more GPU cores. Memory 1010 may include one or more computer readable media that may store computer program logic 1040. Memory 1010 may be implemented as a hard disk and drive, a removable media such as a compact disk, a read-only memory (ROM) or random access memory (RAM) device, for example, or some combination thereof. Processor(s) 1020 and memory 1010 may be in communication using any of several technologies known to one of ordinary skill in the art, such as a bus or point-to-point interconnect. Computer program logic 1040 contained in memory 1010 may be read and executed by processor(s) 1020. One or more I/O ports and/or I/O devices, shown collectively as I/O 1030, may also be connected to processor(s) 1020 and memory 1010. This computer system may be embodied as a system inside a vehicle or instantiated at a remote server facility (in "The Cloud") and accessed via telemetry.

Computer program logic 1040 may include logic that embodies some or all of the processing described above. In the illustrated embodiment, computer program logic 1040 may include a route recording module 1050 to receive the traveler's location information as he travels, and thereby record routes taken by the traveler. Computer program logic 1040 may also include a travel history creation module 1055 for creation of the traveler's travel history. As noted above, this history may include the routes recorded by module 1050 and the frequency with which they have been used by the traveler. Computer program logic 1040 may also include an I/O module 1060 to support the receipt of user input (e.g., start and destination points, and the selection of a route) and the presentation of user output (e.g., descriptions of routes for the traveler).

Computer program logic 1040 may also include modules 1065-1090, which may represent components of route determination module 860 of FIG. 8. A familiar route construction module 1065 may be responsible for construction of routes between a start and destination point, where the constructed routes incorporate segments of routes familiar to the traveler, as seen in the traveler's travel history. The optimal route construction module 1070 may be responsible for building a route between the start and destination points that is optimized in some manner, e.g., with respect to time of travel and/or distance. The route evaluation module 1075 may be responsible for evaluating the familiar routes generated by module 1065, and determining the most familiar route(s). In an embodiment, the evaluation process may include comparison of the constructed familiar routes to the optimal route generated by module 1070. As discussed above, this may allow for the elimination of the more inconvenient familiar routes.

Computer program logic 1040 may also include maneuver identification module 1080 for recognizing difficult maneuvers in a route ultimately chosen by the traveler. Maneuver reference incorporation module 1090 may be responsible for incorporating references to such maneuvers in the selected route, where the references refer to similar maneuvers previously encountered by the traveler as seen in the travel history. Computer program logic 1040 may also include a landmark reference incorporation module 1085 for incorporating references to landmarks into the route selected by the traveler.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

The following examples pertain to further embodiments.

Example 1 is a system for route determination, comprising: a travel history creation module configured to create a travel history of routes traveled by a traveler and their frequency of use; and a route determination module configured to determine a familiar route that is at least partially familiar to the traveler, from a start point to a destination, wherein the determined route includes one or more segments of routes familiar to the traveler, wherein the familiarity of the segments is determined by said travel history.

Example 2 is the system of example 1, wherein said route determination module comprises: a familiar route construction module to construct one or more familiar routes using said travel history; and a route evaluation module configured to evaluate the constructed familiar routes according to their degree of familiarity and determine the familiar route on the basis of the evaluation.

Example 3 is the system of example 2, said route determination module further comprising an optimal route construction module configured to construct an optimal route that is one or more of the shortest route from the start point to the destination and the fastest route from the start point to the destination, for presentation to the traveler, wherein the route evaluation module is further configured to evaluate the convenience of the constructed familiar routes by comparing them to the optimal route.

Example 4 is the system of example 3, further comprising: an input/output module configured to receive a description of the start point and destination; output descriptions of the optimal route and the determined familiar route; and receive a selection of one of the optimal route and the determined familiar route.

Example 5 is the system of example 4, wherein said route determination module further comprises a landmark reference incorporation module configured to incorporate references to landmarks into the descriptions of the optimal route and the determined familiar route.

Example 6 is the system of example 4, wherein said route determination module further comprises: a maneuver identification module configured to identify maneuvers designated as difficult in the travel history; and a maneuver reference incorporation module configured to incorporate references to any such difficult maneuvers in the descriptions of the optimal route and the determined familiar route.

Example 7 is a method of route determination, comprising: creating a travel history for a traveler; receiving descriptions of start and destination points; and determining a familiar route that is at least partially familiar to the traveler, from the start point to a destination, wherein the determined route includes one or more segments of routes familiar to the traveler, wherein the familiarity of the segments is determined by the travel history.

Example 8 is the method of example 7, wherein the creation of the travel history comprises: recording routes of trips taken by the traveler; and assigning scores to the routes or segments of the routes, wherein the scores are based on the frequency with which the route or segment was taken by the traveler.

Example 9 is the method of example 8, wherein the determination of familiar routes comprises: constructing the familiar routes, between the start and destination points, incorporating routes or segments of routes that appear in the travel history; and determining which of the constructed familiar routes are most familiar to the traveler, as determined by the travel history, by evaluating each constructed familiar route based on the familiarity of the constructed familiar routes or of segments thereof, wherein the familiarity of the constructed familiar routes or of segments thereof is determined as a function of the scores assigned to the constructed routes or segments thereof.

Example 10 is the method of example 9, wherein the determination of the most familiar of the constructed familiar routes further comprises: determining which of the constructed routes are most convenient.

Example 11 is the method of example 9, further comprising: determining an optimal route between the start and destination points; outputting a description of the optimal route for the traveler; and outputting a description of one or more of the constructed familiar routes for the traveler.

Example 12 is the method of example 11 further comprising receiving a selection, from the traveler, of one or more of the output routes.

Example 13 is the method of example 11, wherein the creation of the travel history further comprises: determining if the recorded routes contain any maneuvers that are present on a predetermined list of difficult maneuvers; and if so, recording the location of any such maneuvers.

Example 14 is the method of example 13, wherein the outputting of the one or more constructed familiar routes and the optimal route comprises: outputting, for the traveler, an indication of any difficult maneuvers as found on the predetermined list, on the output routes; and outputting references to the locations of any similar difficult maneuvers recorded in the travel history.

Example 15 is the method of example 11, wherein outputting of the routes comprises incorporation of a reference to one or more landmarks in the output routes.

Example 16 is one or more computer readable storage media having computer control logic stored thereon, the computer control logic comprising logic configured to cause a processor to perform route determination, by: creating a travel history for a traveler; receiving descriptions of start and destination points; and determining a familiar route that is at least partially familiar to the traveler, from the start point to a destination, wherein the determined route includes one or more segments of routes familiar to the traveler, wherein the familiarity of the segments is determined by the travel history.

Example 17 is the computer readable media of example 16, wherein the creation of the travel history comprises: recording routes of trips taken by the traveler; and assigning scores to the routes or segments of the routes, wherein the scores are based on the frequency with which the route or segment was taken by the traveler.

Example 18 is the computer readable media of example 17, wherein the determination of familiar routes comprises: constructing the familiar routes, between the start and destination points, incorporating routes or segments of routes that appear in the travel history; and determining which of the constructed familiar routes are most familiar to the traveler, as determined by the travel history, by evaluating each constructed familiar route based on the familiarity of the constructed familiar routes or of segments thereof, wherein the familiarity of the constructed familiar routes or of segments thereof is determined as a function of the scores assigned to the constructed routes or segments thereof.

Example 19 is the computer readable media of example 18, wherein the determination of the most familiar of the constructed familiar routes further comprises: determining which of the constructed routes are most convenient.

Example 20 is the computer readable media of example 18, further comprising logic configured to cause the processor to: determine an optimal route between the start and destination points; output a description of the optimal route for the traveler; and output a description of one or more of the constructed familiar routes for the traveler.

Example 21 is the computer readable media of example 20 further comprising logic configured to cause the processor to receive a selection, from the traveler, of one or more of the output routes.

Example 22 is the computer readable media of example 20, wherein the creation of the travel history further comprises: determining if the recorded routes contain any maneuvers that are present on a predetermined list of difficult maneuvers; and if so, recording the location of any such maneuvers.

Example 23 is the computer readable media of example 22, wherein the outputting of the one or more constructed familiar routes and the optimal route comprises: outputting, for the traveler, an indication of any difficult maneuvers as found on the predetermined list, on the output routes; and outputting references to the locations of any similar difficult maneuvers recorded in the travel history.

Example 24 is the computer readable media of example 20, wherein outputting of the routes comprises incorporation of a reference to one or more landmarks in the output routes.

Example 25 is one or more computer readable storage media having computer control logic stored thereon to perform route determination, the computer control logic comprising logic that, when executed, implements a method or realizes a system as described in any preceding example.

Example 26 is an apparatus to perform the method as recited in any of examples 7 to 15.

Example 27 is at least one machine readable storage medium comprising a plurality of instructions that in response to being executed on a computing device cause the computing device to carry out a method according to any of examples 7 to 15.

Example 28 is an apparatus for route determination, comprising: means for creating a travel history for a traveler; means for receiving descriptions of start and destination points; and means for determining a familiar route that is at least partially familiar to the traveler, from the start point to a destination, wherein the determined route includes one or more segments of routes familiar to the traveler, wherein the familiarity of the segments is determined by the travel history.

Example 29 is the apparatus of example 28, wherein the means for creating the travel history comprises: means for recording routes of trips taken by the traveler; and means for assigning scores to the routes or segments of the routes, wherein the scores are based on the frequency with which the route or segment was taken by the traveler.

Example 30 is the apparatus of example 29, wherein the means for determining familiar routes comprises: means for constructing the familiar routes, between the start and destination points, incorporating routes or segments of routes that appear in the travel history; and means for determining which of the constructed familiar routes are most familiar to the traveler, as determined by the travel history, by evaluating each constructed familiar route based on the familiarity of the constructed familiar routes or of segments thereof, wherein the familiarity of the constructed familiar routes or of segments thereof is determined as a function of the scores assigned to the constructed routes or segments thereof.

Example 31 is the apparatus of example 30, wherein the means for determining the most familiar of the constructed familiar routes further comprises means for determining which of the constructed routes are most convenient.

Example 32 is the apparatus of example 30, further comprising: means for determining an optimal route between the start and destination points; means for outputting a description of the optimal route for the traveler; and means for outputting a description of one or more of the constructed familiar routes for the traveler.

Example 33 is the apparatus of example 32 further comprising: means for receiving a selection, from the traveler, of one or more of the output routes.

Example 34 is the apparatus of example 32, wherein the means for creation of the travel history further comprises: means for determining if the recorded routes contain any maneuvers that are present on a predetermined list of difficult maneuvers, and if so, recording the location of any such maneuvers.

Example 35 is the apparatus of example 34, wherein the means for outputting of the one or more constructed familiar routes and the optimal route comprises: means for outputting, for the traveler, an indication of any difficult maneuver as found on the predetermined list, on the output routes; and means for outputting references to the locations of any similar difficult maneuvers recorded in the travel history.

Example 36 is the apparatus of example 32, wherein means for outputting of the routes comprises means for incorporation of a reference to one or more landmarks in the output routes.

What is claimed is:

1. An apparatus, comprising a processor and memory configured to:
   compute segment familiarity scores for segments of travel trips of a user, each based on a number of times the user travels the respective segment;
   construct first and second travel routes, each between first and second locations, wherein each of the first and second travel routes includes one or more segments of one or more of the travel trips of the user;
   compute a route familiarity score for each of the first and second travel routes based on the segment familiarity scores of the segments included in the respective first and second travel routes;
   select a travel route from amongst the first and second travel routes based on one or more of input from the user and the route familiarity scores of the first and second travel routes; and
   perform one or more of,
      weight the segment familiarity scores of the segments included in the respective first and second travel routes based on one or more of travel times and travel distances of the respective segments, and compute the route familiarity scores of the first and second travel routes based on the weighted familiarity scores of the respective segments, and
      identify a traffic maneuver in the selected travel route, identify the traffic maneuver in a segment of one or more of the travel trips of the user, and notify the user of the traffic maneuvers in the selected travel route and of a similarity between the traffic maneuver in the selected travel route and the traffic maneuver in the segment of the one or more travel trips of the user.

2. The system of claim 1, wherein the processor and memory are further configured to select one of the first and second travel routes based at least in part on the respective route familiarity scores.

3. The system of claim 2, wherein the processor and memory are further configured to:
   compute a convenience score for each of the first and second travel routes based on one or more of a travel time and a travel distance of the respective travel route; and
   select the travel route from amongst the first and second travel routes based further on the respective convenience scores.

4. The system of claim 2, wherein the processor and memory are further configured to:
   construct a third travel route between first and second locations to minimize one or more of travel time and travel distance;
   compute a convenience score for each of the first, second, and third travel routes based on one or more of a travel time and a travel distance of the respective travel route; and
   discard one or more of the first and second travel routes if a difference between the respective convenience score and the convenience score of the third travel exceeds a threshold.

5. The system of claim 1, wherein the processor and memory are further configured to perform the:
   weight the segment familiarity scores of the segments included in the respective first and second travel routes based on one or more of travel times and travel distances of the respective segments; and compute the route familiarity scores of the first and second travel routes based on the weighted familiarity scores of the respective segments.

6. The system of claim 1, wherein the processor and memory are further configured to perform the:
identify a traffic maneuver in the selected travel route;
identify the traffic maneuver in a segment of one or more of the travel trips of the user; and
notify the user of the traffic maneuver in the selected travel route and of a similarity between the traffic maneuver in the selected travel route and the traffic maneuver in the segment of the one or more travel trips of the user.

7. The system of claim 6, wherein the processor and memory are further configured to identify the traffic maneuver as one or more of:
a left-hand exit from a highway;
a left-hand entry to the highway;
a traffic circle; and
a U-turn.

8. The system of claim 1, wherein the processor and memory are further configured to:
identify a landmark that is visible along the selected travel route; and
output a description of the landmark with the selected travel route.

9. A non-transitory computer readable medium encoded with a computer program that includes instructions to cause a processor to:
compute segment familiarity scores for segments of travel trips of a user, each based on a number of times the user travels the respective segment;
construct first and second travel routes, each between first and second locations, wherein each of the first and second travel routes includes one or more segments of one or more of the travel trips of the user;
compute a route familiarity score for each of the first and second travel routes based on the segment familiarity scores of the segments included in the respective first and second travel routes;
a travel route from amongst the first and second travel routes based on one or more of input from the user and the route familiarity scores of the first and second travel routes; and
perform one or more of,
weight the segment familiarity scores of the segments included in the respective first and second travel routes based on one or more of travel times and travel distances of the respective segments, and compute the route familiarity scores of the first and second travel routes based on the weighted familiarity scores of the respective segments, and
identify a traffic maneuver in the selected travel route, identify the traffic maneuver in a segment of one or more of the travel trips of the user, and notify the user of the traffic maneuver in the selected travel route and of a similarity between the traffic maneuver in the selected travel route and the traffic maneuver in the segment of the one or more travel trips of the user.

10. The non-transitory computer readable medium of claim 9, further including instructions to cause the processor to:
select the travel route from amongst the first and second travel routes based at least in part on the respective route familiarity scores.

11. The non-transitory computer readable medium of claim 10, further including instructions to cause the processor to:
compute a convenience score for each of the first and second travel routes based on one or more of a travel time and a travel distance of the respective travel route; and
select one of the first and second travel routes based further on the respective convenience scores.

12. The non-transitory computer readable medium of claim 10, further including instructions to cause the processor to:
construct a third travel route between first and second locations to minimize one or more of travel time and travel distance;
compute a convenience score for each of the first, second, and third travel routes based on one or more of a travel time and a travel distance of the respective travel route; and
discard one or more of the first and second travel routes if a difference between the respective convenience score and the convenience score of the third travel exceeds a threshold.

13. The non-transitory computer readable medium of claim 9, further including instructions to cause the processor to perform the:
weight the segment familiarity scores of the segments included in the respective first and second travel routes based on one or more of travel times and travel distances of the respective segments; and
compute the route familiarity scores of the first and second travel routes based on the weighted familiarity scores of the respective segments.

14. The non-transitory computer readable medium of claim 9, further including instructions to cause the processor to perform the:
identify a traffic maneuver in the selected travel route;
identify the traffic maneuver in a segment of one or more of the travel trips of the user; and
notify the user of the traffic maneuver in the selected travel route and of a similarity between the traffic maneuver in the selected travel route and the traffic maneuver in the segment of the one or more travel trips of the user.

15. The non-transitory computer readable medium of claim 14, further including instructions to cause the processor to identify the traffic maneuver as one or more of:
a left-hand exit from a highway;
a left-hand entry to the highway;
a traffic circle; and
a U-turn.

16. The non-transitory computer readable medium of claim 9, further including instructions to cause the processor to:
identify a landmark that is visible along the selected travel route; and
output a description of the landmark with the selected travel route.

17. A machine-implemented method, comprising:
computing segment familiarity scores for segments of travel trips of a user, each based on a number of times the user travels the respective segment;
constructing first and second travel routes, each between first and second locations, wherein each of the first and second travel routes includes one or more segments of one or more of the travel trips of the user;

computing a route familiarity score for each of the first and second travel routes based on the segment familiarity scores of the segments included in the respective first and second travel routes;

selecting a travel route from amongst the first and second travel routes based on one or more of input from the user and the route familiarity scores of the first and second travel routes; and performing one or more of,
  weighting the segment familiarity scores of the segments included in the respective first and second travel routes based on one or more of travel times and travel distances of the respective segments, and computing the route familiarity scores of the first and second travel routes based in the weighted familiarity scores of the respective segments, and
  identifying a traffic maneuver in the selected travel route, identifying the traffic maneuver in a segment of one or more of the travel trips of the user, and notifying the user the traffic maneuver in the selected travel route and of a similarity between the traffic maneuver in the selected travel route and the traffic maneuver in the segment of the one or more travel trips of the user.

18. The method of claim 17, wherein the selecting includes:
  selecting one of the first and second travel routes based at least in part on the respective route familiarity scores.

19. The method of claim 18, further including:
  computing a convenience score for each of the first and second travel routes based on one or more of a travel time and a travel distance of the respective travel route;
  wherein the selecting further includes selecting the travel route from amongst the first and second travel routes based further on the respective convenience scores.

20. The method of claim 18, further including:
  constructing a third travel route between first and second locations to minimize one or more of travel time and travel distance;
  computing a convenience score for each of the first, second, and third travel routes based on one or more of a travel time and a travel distance of the respective travel route; and
  discarding one or more of the first and second travel routes if a difference between the respective convenience score and the convenience score of the third travel exceeds a threshold.

21. The method of claim 17, further including performing the:
  weighting the segment familiarity scores of the segments included in the respective first and second travel routes based on one or more of travel times and travel distances of the respective segments;
  wherein the computing a route familiarity score includes computing the route familiarity scores of the first and second travel routes based on the weighted familiarity scores of the respective segments.

22. The method of claim 17, further including performing the:
  identifying a traffic maneuver in the selected travel route; and
  identifying the traffic maneuver in a segment of one or more of the travel trips of the user; and
  notifying the user of the traffic maneuver in the selected travel route, and of a similarity between the traffic maneuver in the selected travel route and the traffic maneuver in the segment of the one or more travel trips of the user.

23. The method of claim 22, wherein the identifying a traffic maneuver in the selected travel route and the identifying the traffic maneuver in a segment of one or more of the travel trips of the user each includes identifying the traffic maneuver as one or more of:
  a left-hand exit from a highway;
  a left-hand entry to the highway;
  a traffic circle; and
  a U-turn.

24. The method of claim 17, further including:
  identifying a landmark that is visible along the selected travel route; and
  outputting a description of the landmark with the selected travel route.

* * * * *